US008880608B1

(12) United States Patent
Gyongyi (10) Patent No.: US 8,880,608 B1
(45) Date of Patent: *Nov. 4, 2014

(54) SOCIAL AFFINITY ON THE WEB

(71) Applicant: Google Inc., Mountain View, CA (US)

(72) Inventor: Zoltan I. Gyongyi, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/025,930

(22) Filed: Sep. 13, 2013

Related U.S. Application Data

(63) Continuation of application No. 12/909,826, filed on Oct. 21, 2010, now Pat. No. 8,560,605.

(51) Int. Cl.
*G06F 15/16* (2006.01)
*G06F 17/30* (2006.01)

(52) U.S. Cl.
CPC ............... *G06F 17/30861* (2013.01)
USPC ............... 709/204; 709/205; 709/228; 707/5; 707/10; 707/769

(58) Field of Classification Search
CPC ............... G06F 17/30867; G06F 17/30958; G06F 17/3053; G06F 17/30616; G06F 17/3071; H04L 67/22; H04L 51/32; G06Q 50/01; G06Q 30/0269; G06Q 10/101
USPC ................. 709/204–205, 228; 707/5, 10, 769
See application file for complete search history.

(56) References Cited

U.S. PATENT DOCUMENTS

| 8,185,558 | B1* | 5/2012 | Narayanan et al. ........... 707/798 |
| 2004/0267686 | A1 | 12/2004 | Chayes et al. |
| 2005/0171955 | A1 | 8/2005 | Hull et al. |
| 2006/0274062 | A1 | 12/2006 | Zhang et al. |
| 2007/0112761 | A1 | 5/2007 | Xu et al. |
| 2008/0040475 | A1 | 2/2008 | Bosworth et al. |
| 2009/0319436 | A1 | 12/2009 | Andra et al. |
| 2010/0017431 | A1 | 1/2010 | Schmidt et al. |
| 2010/0049534 | A1* | 2/2010 | Whitnah et al. ................. 705/1 |
| 2011/0004692 | A1* | 1/2011 | Occhino et al. ............... 709/228 |
| 2011/0137932 | A1 | 6/2011 | Wable |
| 2011/0196855 | A1 | 8/2011 | Wable et al. |
| 2012/0001919 | A1 | 1/2012 | Lumer |
| 2012/0004959 | A1* | 1/2012 | Benyamin et al. ........... 705/14.4 |

OTHER PUBLICATIONS

Page et al., "The PageRank Citation Ranking: Bringing Order to the Web". Technical Report, Stanford InfoLab, 1999.

* cited by examiner

*Primary Examiner* — Benjamin M Thieu
(74) *Attorney, Agent, or Firm* — Fish & Richardson P.C.

(57) ABSTRACT

Methods, systems, and apparatus, including computer programs encoded on computer storage devices, for determining social affinities from public data. In one aspect, a method computes numeric affinity scores or weights between pairs of network identities, e.g., identities made public by users of social web sites on the Internet, where the pairs of identities appear to represent pairs of individual people, using explicit and inferred social connections obtained from public user data on the Internet. Some of the system and methods explore all social connections (paths) between any given pair of vertices X and Y in the weighted graph data structure of such social connections and aggregates information about their number and relative strength to produce the affinity score from X to Y.

18 Claims, 3 Drawing Sheets

```
300a
    [S] --M--> [T]                              dist(S,T) = 1
                                                fdist(S,T) = 0
300b
    [S] --F--> [T]                              dist(S,T) = 1
                                                fdist(S,T) = 1
300c
    [S] --M--> [X] --M--> [T]                   dist(S,T) = 2
                                                fdist(S,T) = 0
300d
    [S] --M--> [X] --F--> [Y] --M--> [T]        dist(S,T) = 3
                                                fdist(S,T) = 1
300e
    [S] --F--> [X] --F--> [Y] --F--> [T]        dist(S,T) = infinite
                                                fdist(S,T) = infinite
300f
    [S] --F--> [X] --F--> [Y] --F--> [T]        dist(S,T) = 4 (lower path)
            \                    /^             fdist(S,T) = 1
             M                  M               dist(X,T) = 2 (upper path)
              \> [Z] --M--> [W] /               fdist(X,T) = 0
```

SOCIAL AFFINITY ON THE WEB

CROSS-REFERENCE TO RELATED APPLICATIONS

This application is a continuation of U.S. patent application Ser. No. 12/909,826, filed Oct. 21, 2010, the disclosure of which is expressly incorporated herein by reference in its entirety.

BACKGROUND

This specification relates to processing public social connection information to determine strength of social connections.

With the proliferation of online social sites (web sites with social features), a user may maintain several user accounts across multiple social sites, and may also establish online social connections by becoming friends with or by following other users. Knowledge of a user's social affinity (i.e., strength of the user's social connections) can be useful for applications that process and present information to the user. For example, the social affinity between a person performing a web search and a friend or more distant social contact associated with a particular search result may be useful in selecting, ordering, or presenting web search results.

Many social sites allow users to list their alternate accounts and various social connections publicly, and the social web sites annotate the users' public information with such user data using markup such as XHTML Friends Network (XFN) or Friend of a Friend Project (FOAF) markup. Such annotation makes it possible for users' social information to be collected from different social web sites by a web crawler.

SUMMARY

This specification describes systems and methods that can compute numeric affinity scores or weights between pairs of network identities, e.g., identities made public by users of social web sites on the Internet, where the pairs of identities appear to represent pairs of individual people, using explicit and inferred social connections obtained from public user data on the Internet. Some of the systems and methods explore all social connections (paths) between any given pair of vertices X and Y in the weighted graph data structure of such social connections and aggregates information about their number and relative strength to produce the affinity score from X to Y.

DETAILED DESCRIPTION

Figure 1A:
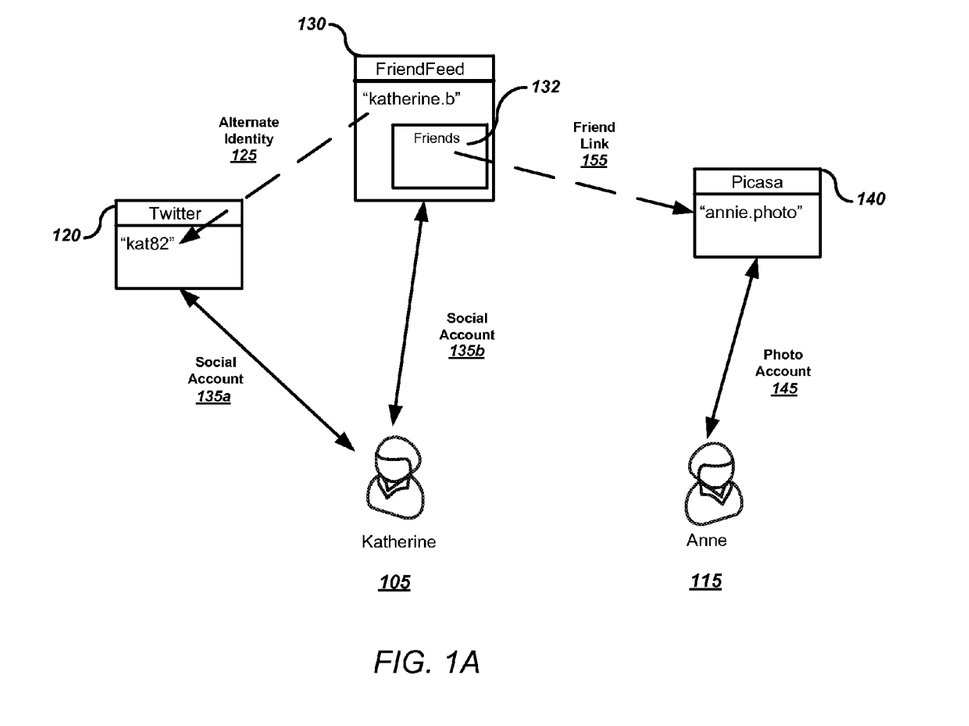
FIG. 1A is an illustration of an example scenario of the multiple public social web sites on which users maintain accounts.

FIG. 1A illustrates an example scenario of the multiple public social web sites on which two web users, Katherine 105 and Anne 115, maintain accounts. Katherine 105 has two social accounts: "kat82" 135a on twitter.com 120 and "katherine.b" 135b on friendfeed.com 130. Anne 115 has a photo account "annie photo" 145 on Picasa 140. Katherine 105 decides to update her FriendFeed account profile. She provides her "kat82" 135a Twitter account as an alternate identity and adds Anne's "annie photo" 145 Picasa account to her friends list 132. FriendFeed annotates profile pages with XFN markup, which allows web crawlers and search engines to extract Katherine's social account data from Katherine's FriendFeed profile page if she makes the page public.

Types of social data that may be discovered from markup on social web pages include user pages (120 130 and 140) as well as social connections (links) (125, 155) between the pages. Discovered social data may be expressed as a directed graph (connection graph) in which the user identities represented by the user pages are the nodes and the social links between pages are the edges.

Figure 1B:
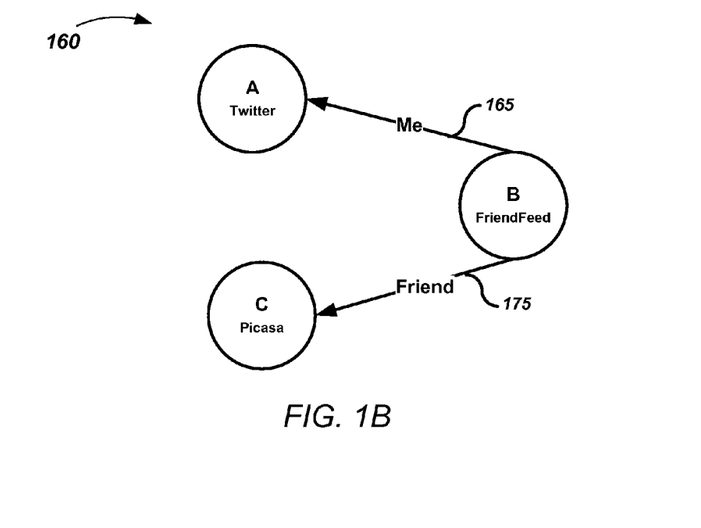
FIG. 1B is a graph of the discovered social data from the example scenario.

FIG. 1B depicts a connection graph 160 of Katherine's and Anne's public social data. The identities represented by nodes A, B, and C are as follows and can be named by uniform resource locators (URLs) of the form shown:

(A) http://twitter.com/kat82
(B) http://friendfeed.com/Katherine
(C) http://picasaweb.google.com/annie photo.

The links 125 and 155 are the edges (B, me, A) 165 and (B, friend, C) 175. The edge (B, me, A) 165 is marked as a "me" edge—it is denoted "(A, me, B)"—and the edge (B, friend, C) 175 is marked as a "friend" edge based on the collected social data. A "me" link connects pages asserted to belong to the same user, while a "friend" link connects pages asserted to belong to different users.

A social connection graph 160 can be used for inferring the social affinity (i.e., the strength of the social bond) between people. Knowledge of social affinities can guide and improve information retrieval in the context of a number of applications. For example, an application may identify socially relevant web results (i.e., content produced by a searcher's direct or indirect friends) for submitted queries. Social affinities can be used to rank search results. Since a searcher is often more interested in the content (e.g., photos, blogs, reviews) posted by close friends, the information about social affinities facilitates making the distinction between close friends and more distant friends to enable adjustment of the search results ranking.

Figure 2:
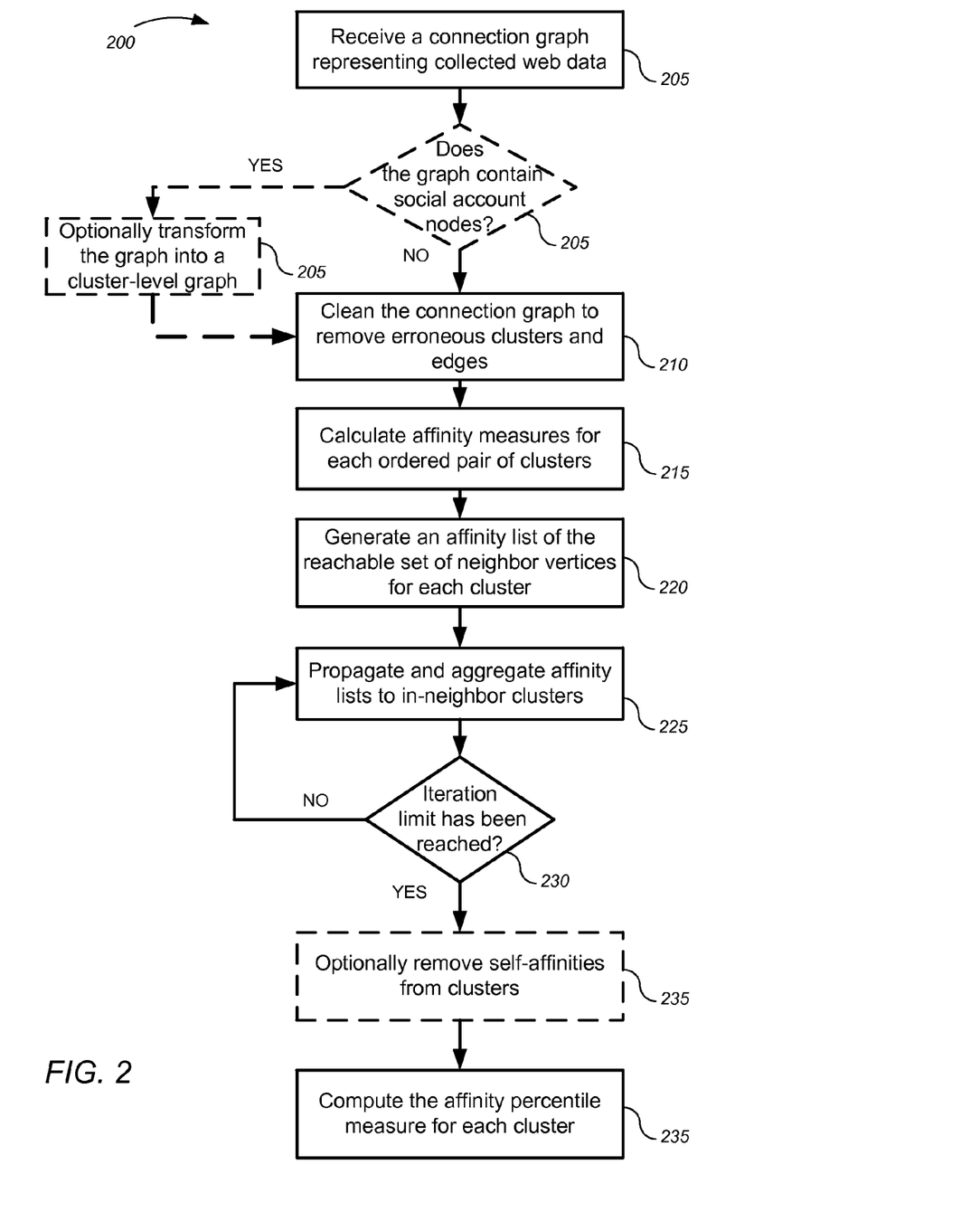
FIG. 2 is a flow diagram of an example method for computing social affinities using a social connection graph.

FIG. 2 is a flow diagram of an example method 200 for computing social affinities using a social connection graph representing collected public social data. For convenience, the method 200 will be described with respect to a system that includes one or more computing devices and performs the method 200.

The system receives 205 a connection graph representing social connection data that has been collected from public information (e.g., information collected from social sites and public web pages). The connection graph may be a node-level graph in which vertices represent single social account nodes (e.g., the nodes A, B, and C in graph 160), or the connection graph may be a cluster-level graph in which a vertex represents a cluster that may include multiple related nodes. In some implementations, the connection graph optionally may be transformed 205 from a node-level graph to a cluster-level graph if the social affinities are to be computed at the level of social identity clusters. The node-level graph to cluster-level graph transformation 205 may be implemented by a social identity clustering system described in patent application Ser. No. 12/909,822, filed Oct. 21, 2010, for "Social Identity Clustering" to Z. Gyongyi et al., which is incorporated herein in its entirety by reference. For clarity, the remainder of this discussion will describe a cluster-level graph having cluster nodes as its vertices, but method 200 can be performed on a node-level graph as well as on a cluster-level graph.

The system cleans 210 the graph in order to identify and remove erroneous cluster nodes and edges. One type of error that can be detected is when non-social links appear as social links due to mistakes in how markup annotations are set up. For example, assume that, due to a programming error, every news article page on a news website is annotated with a "me" link to the website's main page. The website is not a social site, nor do these links represent true social "me" relationships, but the connection graph would represent them as such because of the incorrect annotations.

In some implementations, erroneous cluster nodes and edges are detected either by manual inspection or by automatic detection processes that are triggered by anomalous conditions, or by a combination of both methods. In the above example, the news website node would appear to have thousands of incoming "me" links, implying thousands of alternate identities. This link structure would be recognized as an anomalous link structure, because this many alternate identities is a far greater number of alternate identities than would be expected for a typical user. Being associated with an anomalous link structure would flag a node as possibly being an erroneous node. Detected erroneous nodes may be added to one or more pre-existing exclusion lists, and the cleaning 210 may include checking the graph cluster nodes against the exclusion lists and removing any clusters that should be disregarded. In some implementations, cleaning 210 further may include checking the number of incoming and outgoing "me" and "friend" edges of every cluster remaining in the graph after removal of erroneous nodes, and then removing (along with their incident edges) cluster nodes with an in-degree or an out-degree that is above a respective predetermined threshold T(in,me), T(in,friend), T(out,me) or T(out,friend). For example, assume cluster nodes A and B have 290 and 120 incoming "friend" edges, respectively, and assume that T(in,friend) is 250. A's incoming "friend" edges are removed because their degree is above T(in,friend), but its incoming "me" and its outgoing edges may remain unchanged if their degrees are below their respective thresholds. B's edges will remain unchanged by this test.

In some implementations, the social connection strength for an ordered pair of clusters is quantified as a set of computed affinity measures. In various implementations, the following affinity measures are computed for an ordered pair of clusters (X,Y) representing a pair of identities:

dist: The smallest number of links (edges) on any path to Y from X fdist: The smallest number of "friend" links on any path to Y from X affinity score: A function of the weights of the edges along a path from X to Y affinity score percentile: The percentile of the affinity score within the list of all scores for X In some implementations, the affinity between a source and target cluster initially is computed using dist, fdist, and affinity score measures; the fourth measure, affinity score percentile, is computed once all affinities are determined. Both "me" and "friend" edges are used to determine the social affinity between clusters.

Figure 3:
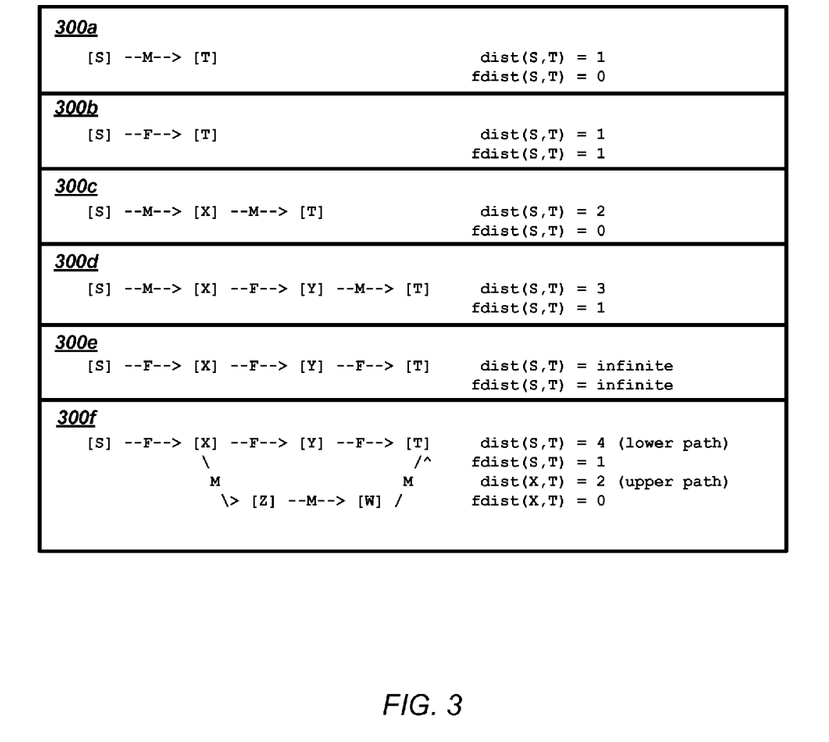
FIG. 3 depicts examples of connection graphs and affinity measurements between connected clusters within the graph.

FIG. 3 provides a set of example graphs 300a-f along with the values for affinity measures dist (S,T) and fdist(S,T) between a source S and a target T cluster. The various examples illustrate S and T being connected by one or more paths which may be composed of "me" edges (arrows marked M), "friend" edges (arrows marked F), or a both. In some implementations, an upper limit on the maximum friend distance (MFD) may be set. In the examples 300a-f, an MFD is set at 2, a distance that would correspond to direct friend and friend-of-friend connections.

In examples 300a-f, dist(S,T) represents the minimum distance (number of edges along the shortest path, having any number of "me" edges, including zero, and/or up to MFD "friend" edges) from S to T, while fdist(S,T) represents the minimum friend distance (number of "friend" edges along the path with fewest but no more than MFD "friend" edges). Note that in example case 300e, dist(S,T) and fdist(S,T) are infinite because the path length has exceeded the MFD.

There may be more than one path connecting two clusters within a graph; example 300f illustrates such a case in which there are two paths from the source node S to the target node T. Values can be calculated for dist(S,T) and fdist(S,T) using the lower path even though the upper path length exceeds the MFD and thus would not be used for affinity measures. Note that when using the same paths to T, but calculating dist(X,T) and fdist(X,T), the upper path no longer exceeds the MFD. In this case, the shortest path between the source node X and the target node T is the upper path, but the lower path between X and T satisfies the fdist criterion of having the minimum friend distance.

The affinity score between a source S and a target T along a path of length k with intermediate nodes $S=X_0, X_1, \ldots, X_k=T$ can be computed using one of the following alternative equations:

$$\prod_{i=0\ldots(k-1)} \frac{W(i, i+1)}{\sqrt{\text{out}(i) * \text{in}(i+1)}} \qquad (1)$$

or $$\prod_{i=0\ldots(k-1)} \frac{W(i, i+1)}{\text{out}(i)} \qquad (2)$$

where W(i,i+1) is the total weight of the edges from $X_i$ to $X_{i+1}$, and in(i) and out(i) are the in- and out-weights of $X_i$ (sum of the weights of the inbound edges to $X_i$ and sum of the weights of the outbound edges from $X_i$, respectively). Equation 1 computes the affinity score based on both in- and out-weights of Xi, while Equation 2 computes the affinity score based only on the out-weights of Xi.

The total weight W(p,q) of all edges from a cluster $X_p$ to a cluster $X_q$ can be calculated using the equation $$W(p, q) = \sum_{i=1\ldots n_{p,q}} d(t_{p,q}(i)) * w_{p,q}(i) \qquad (3)$$

For any edge i of $n_{p,q}$ individual edges from $X_p$ to $X_q$ edges, $t_{p,q}(i)$ is its type ("me" or "friend"), and $w_{p,q}(i)$ is its weight.

d is a discount factor in the [0,1] range; it is applied to the edge weights in order to decrease the impact of more distant nodes along a path. In some implementations d is a constant, with a value in the [0.5,0.9] range. In alternative implementations, d can be set to different values based on edge type $t_{p,q}(i)$ (e.g., d can be set to 0.9 for "me" edges and a lower value, 0.8, for "friend" edges).

In the simplest case, the weight of an edge between two clusters is the sum of the weights of individual edges between nodes in the respective clusters. For example, if cluster #1 contains nodes {A,B} and cluster #2 contains nodes {C,D} and there is an edge from A to D of weight 0.8 and another edge from B to C of weight 0.5, then the weight of the edge from cluster #1 to cluster #2 is 1.3.

Aggregation of edge weights as just described is not necessary for computing weights of edges within node-level graphs. In some implementations, the weights of individual node-level edges are set to 1.0. Alternatively, in some other implementations, a node-level edge weight may be computed by a multiplicative formula based on one or more confidence factors such as confidence in the validity of the edge, reputation of a social site from which the edge was collected, and the age of the edge. For example, a weight can be set to 1.0 if two nodes connected by a "friend" edge had some explicit interaction (e.g., one user posted a comment on the other user's blog post) over the past month, but otherwise the weight is set to a lower value, e.g., 0.7.

In some implementations, the computation of an affinity score includes a vertex weight v(i) to capture the relative importance of clusters in relation to each other. In some implementations, a vertex weight v(i) may be based on a quality measure of a cluster representing a user that is derived from one or a combination of signals such as the number of times the user's content was referenced or user's activity level. For example, v(i) may be computed as a global PageRank score of $X_i$ computed on the directed graph of weighted or unweighted "friend" edges as described in L. Page, S. Brin, R. Motwani and T. Winograd, The PageRank Citation Ranking. Bringing Order to the Web. Technical Report, Stanford InfoLab (1999).

Affinity score calculations including a vertex weight v(i) term can be performed using either of the two equations:

$$\prod_{i=0\ldots(k-1)} \frac{v(i)*W(i, i+1)}{\sqrt{out(i)*in(i+1)}} \quad (4)$$

or $$\prod_{i=0\ldots(k-1)} \frac{v(i)*W(i, i+1)}{out(i)} \quad (5)$$

Equation 4 computes the affinity score based on both in- and out-weights of Xi, while Equation 5 computes the affinity score based only the out-weights of Xi.

The total affinity between a source S and a target T is the sum of affinities along all possible paths of length less than or equal to an upper limit of K. If all existing paths between S and T should be explored, K may effectively be set to infinity. Alternatively, K may be set to a smaller number (e.g., 10 or 20) in order to limit the exploration distance and thus improve system performance.

Turning to the graph in example 300f, the following example is a computation of the total affinity from cluster X to cluster T based on affinity scores calculated using Equation 1. Assume a discount factor d=0.9, and assume that all edges have a weight of 1.0. In these examples, "sqrt" designates square root and "*" designates multiplication.

affinity from Y to T along the path Y-T:

$$\text{aff}_{Y\text{-}T}(Y,T) = W(Y,T)/\text{sqrt}(\text{out}(Y)*\text{in}(T))$$

$$= (d*w_{Y,T})/\text{sqrt}(\text{out}(Y)*\text{in}(T))$$

$$= (0.9*1.0)/\text{sqrt}(1.0*2.0)$$

$$= 0.6364$$

affinity from X to T along the path X-Y-T:

$$\text{aff}_{X\text{-}Y\text{-}T}(X,T) = [W(X,Y)/\text{sqrt}(\text{out}(X)*\text{in}(Y))]*$$

$$[W(Y,T)/\text{sqrt}(\text{out}(Y)*\text{in}(T))]$$

$$= [W(X,Y)/\text{sqrt}(\text{out}(X)*\text{in}(Y))]*\text{aff}_{Y\text{-}T}(Y,T)$$

$$= [(0.9*1.0)/\text{sqrt}(2.0*1.0)]*0.6364$$

$$= 0.6364*0.6364$$

$$= 0.4050$$

total affinity from X to T along all paths (X-Y-T and X-Z-W-T):

$$\text{aff}(X,T) = \text{aff}_{X\text{-}Z\text{-}W\text{-}T}(X,T) + \text{aff}_{X\text{-}Y\text{-}T}(X,T) = \ldots$$

The system generates 220 an affinity list containing affinities from each cluster to a reachable set of neighbor clusters. This list may be stored in any convenient data structure. Every reachable neighbor cluster of a cluster X may not be included on the affinity list for X. For example, a reachable neighbor cluster Y may not be included in the affinity list for X because the path length to Y is beyond the MFD limit. Every reachable neighbor cluster of X may not be included on the affinity list for X also because there may be limits on the list size. For example, X may have a large number of out-edges, and a limit may be placed on the number of reachable neighbor nodes that can be included on the affinity list of nodes with a large number of out-edges because there is an exponential growth in reachable nodes by distance in the presence of large out-degrees.

In some implementations, affinity list size can be controlled by applying a set of rules to determine whether to calculate an affinity score between clusters X and Y. An example set of such rules is:
  If the friend distance<=1, a score is always generated.
  If the friend distance>1 and <=MFD, a score may or may not be generated, depending on whether individual contributing paths contribute more (partial) affinity than a certain minimum affinity threshold (MAT).
  If the friend distance>MFD, no score is generated.

In alternative implementations, affinity list size can be controlled by setting a hard maximum list size limit (e.g., 10,000 entries). In some other implementations, affinity list size can be controlled by setting a minimum relative affinity score requirement between entries on the list as a threshold for inclusion as an entry. For example, the last entry on a list may be required to have at least 1% of the affinity score of the first entry on the list.

Once initial affinity lists are computed, the system propagates and aggregates 225 affinity lists to in-neighbor vertices. In some implementations, this step is repeated 230 until no further changes to existing affinity lists occur or an iteration limit is reached.

In propagation and aggregation 225, the current affinity lists of the in-neighbor clusters are added to the affinity list of a cluster X, and the affinity measures (dist, fdist, and affinity score) of new entries on the new affinity list of cluster X are updated.

The following example references the path of example 300f and illustrates the propagation and aggregation of affinity lists to cluster X. Assume that d=0.9 and that all edge weights are set to 1.

Assume that the current affinity list of X contains the following two entries:
  cluster Y: [dist=1, fdist=1, affinity=0.6364], and
  cluster Z: [dist=1, fdist=0, affinity=0.6364].
Also assume that the current affinity list of Y contains the following single entry:
  cluster T: [dist=1, fdist=1, affinity=0.6364].
Finally, assume that the current affinity list for Z contains the following entry:
  cluster W: [dist=1, fdist=0, affinity=0.9].
Then, the entries from the lists for Y and Z are combined with the current affinity list of X to form the new affinity list of X:
  cluster T: [dist=2, fdist=2, affinity=0.6364*0.6364],
  cluster W: [dist=2, fdist=0, affinity=0.6364*0.9],
  cluster Y: [dist=1, fdist=1, affinity=0.6364], and
  cluster Z: [dist=1, fdist=0, affinity=0.6364].

To compute an affinity score for a new affinity list entry that is a combination of the current entry and an entry from a propagated list (e.g., the entries for cluster T and cluster W on the new list of X in the above example), the affinity scores are multiplied.

Once propagation and aggregation of affinity lists has completed, the system optionally removes 235 any self-affinities (i.e., an entry for a cluster on its own affinity list) before computing the affinity percentile measure for each cluster, the fourth affinity measure previously described.

Social affinity computations may be implemented within a distributed environment. One example distributed implementation technique is MapReduce. The term MapReduce describes both a programming model and an implementation of the model for processing and generating large data sets. The model and its library implementation will both be referred to as MapReduce. Using MapReduce, programmers specify a map function that processes input (key, value) pairs to generate a set of intermediate (key, value) pairs, and a reduce function that merges all intermediate values associated with the same intermediate key. Programs written in this functional style can automatically be parallelized and executed on a large cluster of commodity computers. The runtime system or framework can be implemented to partition the input data, schedule the program's execution across a set of machines, handle machine failures, and manage the required inter machine communication.

Typically, several map tasks operate independently on different processors (e.g., on different computing devices) and on different portions of input data. Similarly, several reduce tasks operate independently on a portion of the intermediate data. The portions of the intermediate data are partitioned according to the intermediate keys so that the same reducer operates on all values for a given intermediate key.

An implementation of method 200 as a set of MapReduce programs is described below. Each bullet point represents a separate program; there are one or more programs for each action in method 200.

Build the Cluster-Level Social Graph 205:
    Retrieve the social graph of nodes and connecting 'me' and 'friend' edges (represented as node adjacency lists) from the source data store.
    [Optional] Using the graph and the node-to-cluster mappings NC, generate new graph G with nodes replaced by cluster IDs.
    Finalize G by merging separate adjacency lists, for nodes that got clustered, into a single one, for the corresponding cluster.
  Clean the Social Graph by Removing Erroneous Vertices and Edges 210:
    From the graph, remove edges with at least one incident cluster (or node) that appears on the exclusion list. Also remove edges of the appropriate type of clusters (or nodes) with a 'me' or 'friend' in- or out-degree above the corresponding threshold.
  Propagate and Aggregate Neighbor Affinities to Clusters 215-225:
    Output each cluster's (or node's) current affinity list to its in-neighbors; generate each cluster's or (node's) new affinity list AL by computing distances and affinity scores to out-neighbors and merging the current affinity lists received. Reduce affinity list size by applying truncation rules.
  Post-Process Affinities by Removing Self-Affinities and Computing Score Percentiles 235:
    Using AL, generate final affinity lists by removing self-affinities and computing score percentiles.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
receiving, by one or more processors, a graph representing public social data comprising identity data and social link data, the graph comprising nodes and edges, each node representing an identity provided from the public social data, each edge representing a social link between identities and having an edge type and a weight associated therewith, a first edge type being a social link that connects identities associated with the same entity, and a second edge type being a social link that connects identities associated with differing entities;
determining, by the one or more processors, for a first node and a second node in a pair of nodes:
a first distance as a smallest number of edges of the first edge type and the second edge type on any path from the first node to the second node;
a second distance as a smallest number of edges of the second edge type on any path from the first node to the second node;
a score based on weights of edges along a path from the first node to the second node;
an affinity between the first node and the second node based on the first distance, the second distance, and the score; and
determining, by the one or more processors, an aggregated affinity between a source node and a target node, the aggregated affinity being determined based on the affinities of a plurality of pairs of nodes along all possible paths from the source node to the target node.

2. The method of claim 1, wherein all possible paths from the source node to the target node have lengths that do not exceed an upper limit.

3. The method of claim 1, further comprising, prior to determining the affinity:
determining that one or more nodes are erroneous; and
removing the one or more nodes from the graph.

4. The method of claim 1, further comprising prior to determining the affinity:
determining that one or more edges are erroneous; and
removing the one or more edges from the graph.

5. The method of claim 1, further comprising, for a particular pair of nodes, determining that the second distance exceeds a threshold distance and, in response, forgo determining the affinity for the particular pair of nodes.

6. The method of claim 1, further comprising, for a particular pair of nodes, determining that the second distance does not exceed a threshold and, in response, determining the affinity for the particular pair of nodes.

7. A computer storage medium encoded with a computer program, the program comprising instructions that when executed by one or more computers cause the one or more computers to perform operations comprising:
receiving a graph representing public social data comprising identity data and social link data, the graph comprising nodes and edges, each node representing an identity provided from the public social data, each edge representing a social link between identities and having an edge type and a weight associated therewith, a first edge type being a social ink that connects identities associated with the same entity, and a second edge type being a social link that connects identities associated with differing entities;
determining for a first node and a second node in a pair of nodes:
a first distance as a smallest number of edges of the first edge type and the second edge type on any path from the first node to the second node;
a second distance as a smallest number of edges of the second edge type on any path from the first node to the second node;
a score based on weights of edges along a path from the first node to the second node X to Y;
an affinity between the first node and the second node based on the first distance, the second distance, and the score; and
determining an aggregated affinity between a source node and a target node, the aggregated affinity being determined based on the affinities of a plurality of pairs of nodes along all possible paths from the source node to the target node.

8. The computer storage medium of claim 7, wherein all possible paths from the source node to the target node have lengths that do not exceed an upper limit.

9. The computer storage medium of claim 7, the operations further comprising, prior to determining the affinity:
determining that one or more nodes are erroneous; and
removing the one or more nodes from the graph.

10. The computer storage medium of claim 7, the operations further comprising prior to determining the affinity:
determining that one or more edges are erroneous; and
removing the one or more edges from the graph.

11. The computer storage medium of claim 7, the operations further comprising, for a particular pair of nodes, determining that the second distance exceeds a threshold distance and, in response, forgo determining the affinity for the particular pair of nodes.

12. The computer storage medium of claim 7, the operations further comprising, for a particular pair of nodes, determining that the second distance does not exceed a threshold and, in response, determining the affinity for the particular pair of nodes.

13. A system comprising:
one or more computers and one or more storage devices storing instructions that when executed by the one or more computers cause the one or more computers to perform operations comprising:
receiving a graph representing public social data comprising identity data and social link data, the graph comprising nodes and edges, each node representing an identity provided from the public social data, each edge representing a social link between identities and having an edge type and a weight associated therewith, a first edge type being a social link that connects identities associated with the same entity, and a second edge type being a social link that connects identities associated with differing entities;
determining for a first node and a second node in a pair of nodes:
a first distance as a smallest number of edges of the first edge type and the second edge type on any path from the first node to the second node;
a second distance as a smallest number of edges of the second edge type on any path from the first node to the second node;
a score based on weights of edges along a path from the first node to the second node;
an affinity between the first node and the second node based on the first distance, the second distance, and the score; and
determining an aggregated affinity between a source node and a target node, the aggregated affinity being determined based on the affinities of a plurality of pairs of nodes along all possible paths from the source node to the target node.

14. The system of claim 13, wherein all possible paths from the source node to the target node have lengths that do not exceed an upper limit.

15. The system of claim 13, the operations further comprising, prior to the determining the affinity:
   determining that one or more nodes are erroneous; and
   removing the one or more nodes from the graph.

16. The system of claim 13, the operations further comprising prior to determining the affinity:
   determining that one or more edges are erroneous; and
   removing the one or more edges from the graph.

17. The system of claim 13, the operations further comprising, for a particular pair of nodes, determining that the second distance exceeds a threshold distance and, in response, forgo determining the affinity for the particular pair of nodes.

18. The system of claim 13, the operations further comprising, for a particular pair of nodes, determining that the second distance does not exceed a threshold and, in response, determining the affinity for the particular pair of nodes.

* * * * *